May 19, 1936. C. BATCHELLER 2,041,041
LAMINATED ROOFING OR SHEET PRODUCT
Filed Dec. 23, 1933

INVENTOR
CLEMENTS BATCHELLER
BY
ATTORNEYS

Patented May 19, 1936

2,041,041

UNITED STATES PATENT OFFICE 2,041,041

LAMINATED ROOFING OR SHEET PRODUCT

Clements Batcheller, Portsmouth, N. H.

Application December 23, 1933, Serial No. 703,845

14 Claims. (Cl. 18—47.5)

My invention relates to rigid or semi-rigid roofing and sheathing products, and to the method of making the same. It relates particularly to articles of this character composed primarily of hydraulic cement and fibrous material and comprising two or more laminae having different characteristics, such as color, which are concreted together to form a unitary structure.

It has heretofore been proposed to effect a decorative coloration or cement-fiber products of the character described by incorporating a color pigment with the materials of which the base is made. In this way a solid colored product is obtained. Due to the comparatively large amount of pigment required to color the entire product and to the relatively high cost of some of the pigments, such as green chrome oxide, which might otherwise be employed, products of this character are, for the most part, limited to those in which the color effect is obtained by the common iron oxide colors and ochres.

Color effects are also produced by a veneering process which consists in applying a water solution of neat cement and pigment directly to the face of the product while it is still plastic and bonding it to the body by pressure. Such a color veneer is only about three-thousandths of an inch thick, it cannot be bonded perfectly to a cement-fiber base, and hence, its life upon exposure to the elements is short.

Colored products produced by pressing particles of colored slate and the like directly into the surface of a cement-fiber base are unsatisfactory because of their high porosity and consequent moisture permeability.

The principal object of my invention is to produce a roofing or sheathing product of the rigid or semi-rigid type having a body comprising hydraulic cement and fibrous material and provided with a colored surface or layer bonded to and concreted with the body of the product to form a unitary structure substantially impervious to moisture and which will not effloresce.

Specimens of my novel product are illustrated in the accompanying drawing in which—

The objects of my invention are attained by the use of asphalt or preferably asphalt emulsion in the manner hereinafter set forth.

Figure 6:
Fig. 6 is a fragmentary enlarged cross section showing a thin color layer comprising neat cement and pigment concreted to a base element containing asphalt.

I may, for example, incorporate small proportions (preferably less than about 5% by weight) of asphalt emulsion in the plastic mixture of hydraulic cement and fibrous material going to make up the body 1 of the product as shown in Fig. 6. To this body, while in the plastic state, a surface layer 2 of neat hydraulic cement and pigment may be bonded and the two concreted together by subjecting the product to substantial pressure. This pressure will extrude some of the asphalt from the body of the product and bring it to the surface where it serves not only to seal the body of the product and render it impervious to moisture but also to seal and bond the color layer to the body.

Figure 1:
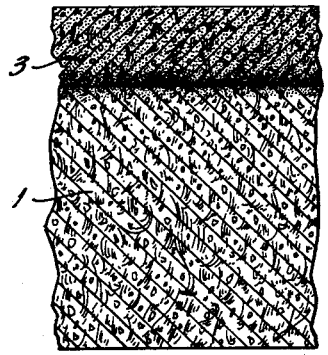
Fig. 1 is a fragmentary enlarged cross section of one form of my invention in which asphalt is incorporated in the top layer or lamina.
Figure 3:
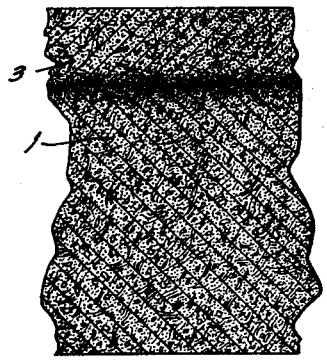
Fig. 3 is a fragmentary enlarged cross section in which asphalt has been incorporated in both laminae.
Figure 4:
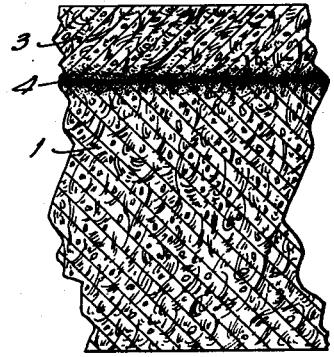
Fig. 4 is a fragmentary enlarged cross section in which asphalt is placed between the laminae before they are concreted together.
Figure 5:
Fig. 5 is a fragmentary enlarged cross section showing color granules concreted to a base containing asphalt.

A much thicker layer of color and one which is more firmly bonded to the body of the product can be produced by adding a small proportion of asphalt emulsion to the colored plastic 3, as shown in Fig. 1, or preferably to both the color plastic 3 and the body plastic 1, as shown in Fig. 3, it being understood that the stippling in each figure represents asphalt. Only very small percentages of asphalt emulsion are necessary to obtain perfect bonding and a moisture impervious product, but percentages up to those which do not detrimentally affect the coloration may obviously be employed. For example, the bonding of a color layer to the body of the product and the impermeability of the composite structure is greatly improved by additions of asphalt emulsion to the color plastic in amounts as small as from ½% to 1% by weight. Such small amounts of asphalt do not diminish the brilliancy of the color, and the surface texture of the product is decidedly improved thereby.

Figure 2:
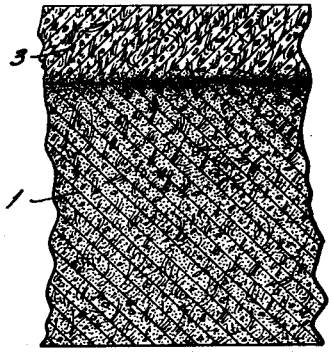
Fig. 2 is a fragmentary enlarged section in which asphalt is incorporated in the base or lower lamina.

Instead of using asphalt incorporated either in the body of the product, as shown in Fig. 2, or in the color layer, as shown in Fig. 1, or in both, as shown in Fig. 3, I may spray or otherwise apply a single or double film 4 of liquid or plastic asphalt directly to the surface of the body while it is still wet and plastic. This application may be either an asphalt emulsion or a straight asphalt reduced to a condition of suitable fluidity by heat or fluxing agents. Directly upon this single or double film of asphalt I may apply a heavy plastic coating of pigment color combined with neat cement and water, or, I may form the color layer as a separate lamina and thereafter apply it to the base. The laminated structure is then thoroughly bonded and concreted together, while plastic, by the application of substantial pressure thereto.

Where only a thin film or veneer of color is desired, I may instead of applying a heavy layer of colored plastic, spray a film of neat cement and pigment, either with or without an asphalt emulsion, over the asphalt covered surface and bond the whole together by pressure.

Colored granules 5 may be used instead of pigments to obtain the desired color effect, and these may be applied directly to the asphalt coated base and bonded therewith by the application of pressure. Where an asphalt emulsion is incorporated in the cement-fiber base, color nodules or granules may be bonded directly thereto without spraying the base with asphalt and without incorporating an asphaltic emulsion with the color granules, although it is to be understood that the latter may be done if desired.

In any case the asphalt, whether used as an emulsion or sprayed or otherwise applied directly to the surface of the cement-fiber base, serves perfectly to bond the color layer to the body of the product when substantial pressure is applied and the whole is in plastic condition. In the one case the asphalt is already between the layers to be bound together and in the other case it is brought thereby pressure. The asphalt serves effectually to seal the product against the entrance of moisture and thus effectually to prevent efflorescence.

While the products described above may be manufactured commercially by the use of any equipment now used in the art, I prefer to use the machine disclosed in my copending application Serial No. 553,818.

While I have described my invention in its preferred embodiment, it is to be understood that the words which I have used are words of description and not of limitation. Hence, changes within the purview of the appended claims may be made without departing from the true scope and spirit of my invention in its broader aspects.

What I claim is:

1. A laminated roofing or sheathing product of the character described comprising a base lamina containing fibrous material and hydraulic cement, and a surface lamina containing hydraulic cement and a coloring substance; said laminae being concreted together to form a unitary structure, and the zone including the adjacent portions of said laminae containing a minor quantity of asphalt.

2. A laminated roofing or sheathing product of the character described comprising a base lamina containing fibrous material and hydraulic cement, a surface lamina containing hydraulic cement and a coloring substance, and a zone containing portions of both said laminae and a minor quantity of asphalt.

3. A laminated roofing or sheathing product of the character described comprising a plurality of laminae having different characteristics concreted together but each containing hydraulic cement and a small quantity of an asphalt initially miscible with water.

4. The method of making a laminated roofing or sheathing product of the character described which comprises forming a base lamina of a plastic containing fibrous material and hydraulic cement, applying a thin layer or coating of liquid asphalt to a surface thereof while plastic, forming a surface lamina of a plastic containing coloring pigment and hydraulic cement, superposing the surface lamina on the asphalt covered surface of the base lamina, and compacting and concreting the laminae together while plastic by the application of substantial pressure.

5. The method of making a laminated roofing or sheathing product of the character described which comprises forming a base lamina of a plastic containing fibrous material, hydraulic cement and a small proportion of asphalt emulsion, applying a thin layer or coating of liquid asphalt to a surface thereof while plastic, forming a surface lamina of plastic containing coloring pigment and hydraulic cement, superposing the surface lamina on the base lamina, and compacting and concreting the laminae together, while plastic, by the application of substantial pressure.

6. The method of making a laminated roofing or sheathing product of the character described which comprises forming a base lamina of a plastic containing fibrous material and hydraulic cement, applying a thin layer or coating of liquid asphalt to a surface thereof while plastic, forming a surface lamina of a plastic containing coloring pigment, a small quantity of asphalt emulsion, and hydraulic cement, superposing the surface lamina on the asphalt covered surface of the base lamina, and compacting and concreting the laminae together while plastic by the application of substantial pressure.

7. The method of making a laminated roofing or sheathing product of the character described which comprises forming a base lamina of a plastic containing fibrous material, hydraulic cement and a small proportion of asphalt emulsion, applying a thin layer or coating of liquid asphalt to a surface thereof while plastic, forming a surface lamina of plastic containing coloring pigment, a small quantity of asphalt emulsion, and hydraulic cement, superposing the surface lamina on the base lamina, and compacting and concreting the laminae together, while plastic, by the application of substantial pressure.

8. The method of making a color surfaced roofing or sheathing product of the character described which comprises forming the base of said product from a plastic mixture comprising hydraulic cement and fibrous material, applying a coating of asphalt to said base while it is plastic, applying a layer of coloring material to said asphalt coating, and compacting and concreting the whole together, while still plastic, by the application of substantial pressure.

9. A roofing or sheathing product of the rigid cementitious type comprising a plurality of layers or laminae of the same general character but having somewhat different characteristics, such as color, concreted together with a minor quantity of asphalt to form a dense unitary structure; at least one of said laminae comprising principally fibrous material and hydraulic cement.

10. A roofing or sheathing product of the rigid cementitious type comprising a plurality of layers or laminae of the same general character but having somewhat different characteristics, such as color, concreted together with a minor quantity of asphalt to form a dense unitary structure; each lamina containing hydraulic cement as a principal bonding material and at least one of said laminae containing a minor quantity of asphalt.

11. A roofing or sheathing product of the rigid cementitious type comprising a plurality of layers or laminae of the same general character but having somewhat different characteristics, such as color, concreted together with a minor quantity of asphalt to form a dense unitary structure; one of said laminae containing fibrous material and at least one of said laminae containing a minor quantity of asphalt.

12. A roofing or sheathing product of the rigid cementitious type comprising a plurality of layers or laminae of the same general character but having somewhat different characteristics, such as color, concreted together to form a dense unitary structure; at least one of said laminae comprising principally fibrous material and hydraulic cement, and all of said layers containing a small quantity of asphalt.

13. A roofing or sheathing product of the rigid, cement-asbestos type characterized by its resistance to efflorescence and comprising a base portion of hydraulic cement and fibrous material, and a surface portion containing a coloring medium; the surface portion and the adjacent portion of the base being coalesced together and the zone of coalescence containing asphalt but in a quantity less than will substantially affect the color of the surface portion.

14. The method of making a dense roofing or sheathing product of the rigid, cementitious type having laminae of different character which comprises separately forming said laminae from plastic fiber mixtures containing hydraulic cement, superposing said laminae and subjecting the whole to substantial pressure while plastic with an asphalt film between said laminae.

CLEMENTS BATCHELLER.